United States Patent
Dorton et al.

(10) Patent No.: US 7,497,186 B2
(45) Date of Patent: Mar. 3, 2009

(54) ANIMAL SELF-CARRIED HYDRATING SYSTEM

(76) Inventors: Patricia Dorton, 1555 12th St., Cuyahoga Falls, OH (US) 44223; Charlene Stuart, 8371 Brandywine Rd., Northfield, OH (US) 44067

( * ) Notice: Subject to any disclaimer, the term of this patent is extended or adjusted under 35 U.S.C. 154(b) by 0 days.

(21) Appl. No.: 11/066,682

(22) Filed: Feb. 25, 2005

(65) Prior Publication Data

US 2005/0217609 A1 Oct. 6, 2005

(51) Int. Cl.
  *A01K 7/06* (2006.01)
  *A45F 5/00* (2006.01)
(52) U.S. Cl. .................... 119/72; 224/148.2
(58) Field of Classification Search ................. 119/792, 119/72, 61.56, 907, 770, 856, 850; 224/148.1, 224/148.2, 148.3, 148.4, 148.5, 148.6; 239/152, 239/153, 154
  See application file for complete search history.

(56) References Cited

U.S. PATENT DOCUMENTS

| | | | | |
|---|---|---|---|---|
| 536,909 A * | 4/1895 | Banks | .......................... | 222/148 |
| 1,003,855 A * | 9/1911 | Adams | ........................ | 239/153 |
| 1,003,856 A * | 9/1911 | Adams | ........................ | 239/153 |
| 1,138,500 A * | 5/1915 | Naylor | ........................ | 239/433 |
| 1,913,006 A * | 6/1933 | Smith | ........................ | 224/148.2 |
| 3,987,869 A * | 10/1976 | Bowers | .................... | 184/105.1 |
| 4,090,650 A * | 5/1978 | Gotta | ........................ | 224/148.2 |
| 4,139,130 A * | 2/1979 | Glusker et al. | ............ | 224/148.2 |
| 4,355,600 A * | 10/1982 | Zielinski | ..................... | 119/850 |
| 4,526,298 A * | 7/1985 | Boxer et al. | ................. | 222/130 |
| 4,627,554 A * | 12/1986 | Leibinsohn | ................. | 222/103 |
| 4,688,643 A * | 8/1987 | Carter et al. | ................... | 169/33 |
| 4,998,654 A * | 3/1991 | Bruzek et al. | ............... | 224/607 |
| 5,060,833 A * | 10/1991 | Edison et al. | ............. | 224/148.2 |
| 5,115,947 A * | 5/1992 | McDonnell et al. | ......... | 222/107 |
| 5,137,094 A * | 8/1992 | Broussard | ..................... | 169/15 |
| 5,184,762 A * | 2/1993 | Nevitt | ...................... | 224/148.6 |
| 5,427,290 A * | 6/1995 | Thatcher | ................... | 224/148.2 |
| 5,478,015 A * | 12/1995 | Black | .......................... | 239/154 |
| 5,566,645 A * | 10/1996 | Cole | ........................... | 119/712 |
| 5,595,325 A * | 1/1997 | Leres | ........................ | 222/135 |
| 5,632,235 A * | 5/1997 | Larsen et al. | ............... | 119/856 |
| D383,255 S * | 9/1997 | Caditz | ........................ | D30/145 |
| 5,727,720 A * | 3/1998 | Thatcher | ..................... | 224/664 |
| 5,732,860 A * | 3/1998 | Faraj | ........................ | 224/148.2 |
| 5,738,043 A * | 4/1998 | Manuel | ........................ | 119/497 |
| 5,755,368 A * | 5/1998 | Bekkedahl | .................. | 224/414 |
| 5,887,772 A * | 3/1999 | Dooley | ........................ | 224/191 |
| 5,901,532 A * | 5/1999 | Bopp | ............................ | 54/66 |
| 5,938,089 A * | 8/1999 | Abreu-Marston | ........ | 224/148.5 |
| 5,975,387 A * | 11/1999 | Gleason et al. | ........... | 224/148.2 |
| D429,390 S * | 8/2000 | Grady et al. | ................ | D30/152 |
| D429,391 S * | 8/2000 | Grady et al. | ................ | D30/152 |
| 6,182,872 B1 * | 2/2001 | Six | ........................... | 224/148.5 |

(Continued)

*Primary Examiner*—Yvonne R. Abbott
(74) *Attorney, Agent, or Firm*—Kathleen K. Bowen

(57) ABSTRACT

An animal self-carried hydrating system comprises an animal harness, a fluid container for holding the fluid, and a fluid dispensing mechanism. The animal harness is securable on the animal by a fastening system. The animal harness has a fluid pocket for holding the fluid container. The fluid dispensing mechanism is attached to the fluid container, in fluid communication with the fluid in the fluid container. The fluid dispensing mechanism is such that it can dispense fluid from the fluid container to the animal while the fluid container is in the fluid pocket.

1 Claim, 3 Drawing Sheets

U.S. PATENT DOCUMENTS

| | | | |
|---|---|---|---|
| 6,220,490 B1 * | 4/2001 | O'Hara | 224/148.2 |
| 6,241,135 B1 * | 6/2001 | Thatcher | 224/148.5 |
| 6,257,473 B1 * | 7/2001 | Ringelstetter | 224/675 |
| 6,267,083 B1 * | 7/2001 | Chimienti | 119/850 |
| D457,988 S * | 5/2002 | Kerrigan | D30/145 |
| 6,412,707 B1 * | 7/2002 | Wirz | 239/154 |
| 6,422,439 B1 * | 7/2002 | Kelliher et al. | 224/148.2 |
| 6,427,779 B1 * | 8/2002 | Richman | 169/30 |
| 6,431,123 B1 * | 8/2002 | Hibbert | 119/850 |
| 6,443,101 B1 * | 9/2002 | Fazio | 119/792 |
| 6,516,748 B1 * | 2/2003 | Jackson | 119/72 |
| 6,571,745 B2 * | 6/2003 | Kerrigan | 119/858 |
| 6,637,367 B1 * | 10/2003 | Dost et al. | 119/28.5 |
| 6,679,198 B1 * | 1/2004 | LaGarde | 119/792 |
| 6,718,912 B2 * | 4/2004 | Pappas | 119/72.5 |
| 6,758,165 B2 * | 7/2004 | Pappas et al. | 119/72.5 |
| 6,820,780 B2 * | 11/2004 | Forsman et al. | 224/148.2 |
| 6,889,882 B1 * | 5/2005 | Leep | 224/579 |
| 7,073,688 B2 * | 7/2006 | Choi et al. | 222/175 |
| 2002/0074369 A1 * | 6/2002 | Forsman et al. | 224/148.2 |
| 2002/0113101 A1 * | 8/2002 | Skillern | 224/148.2 |
| 2004/0079775 A1 * | 4/2004 | Choi et al. | 224/148.2 |
| 2004/0128747 A1 * | 7/2004 | Bumbarger et al. | 2/458 |
| 2005/0029319 A1 * | 2/2005 | Robins et al. | 224/148.2 |
| 2005/0035160 A1 * | 2/2005 | Forsman | 224/148.2 |

* cited by examiner

ANIMAL SELF-CARRIED HYDRATING SYSTEM

BACKGROUND

The present invention is in the field of animal hydration. More specifically this invention relates to portable animal hydration systems, specifically a system which can be carried by the animal.

When walking or hiking with your pet, such as your dog, your pet will need hydrated. To avoid possibly contaminated water sources, people often bring along a fluid for hydrating their pet. In the past, this has meant that whoever was walking the animal was also carrying their own water, and water for the animal. To eliminate this problem, several designs have had a vest for an animal, such as a dog, which contained pockets for the animal to carry its own water bottles. One such design even included a portable dog dish for the water to be poured into. But all such designs have required removing the water bottles from the vest in order to hydrate the animal.

A system is desired which would allow an animal to carry their own fluid, and to allow for hydrating the animal without removing this fluid from the carrying mechanism. Further, a hydrating system is desired which would allow for externally hydrating the animal as well, such as hydrating the animal's coat or paws, to cool the animal down, also without removing the fluid from the carrying mechanism.

SUMMARY OF INVENTION

An animal self-carried hydrating system comprises an animal harness, a fluid container for holding the fluid, and a fluid dispensing mechanism. The animal harness is securable on the animal by a fastening system. The animal harness has a fluid pocket for holding the fluid container. The fluid dispensing mechanism is attached to the fluid container, in fluid communication with the fluid in the fluid container. The fluid dispensing mechanism is such that it can dispense fluid from the fluid container to the animal while the fluid container is in the fluid pocket.

DETAILED DESCRIPTION

Figure 1:
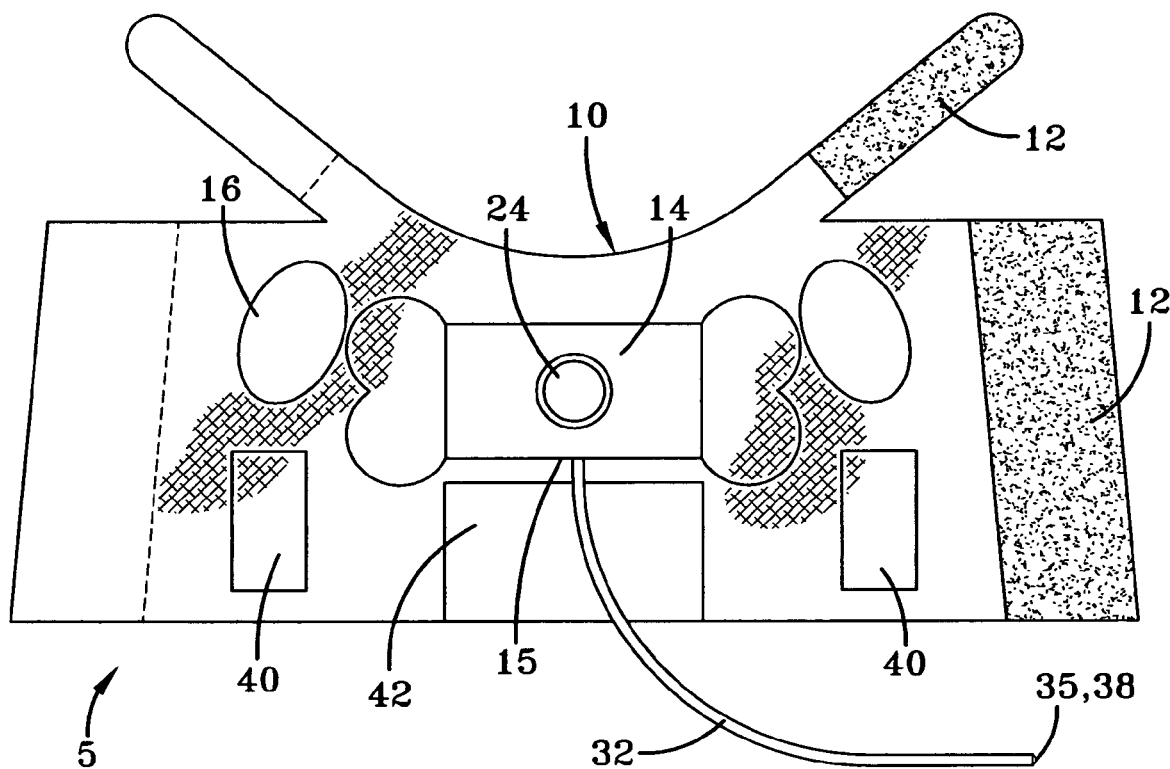
FIG. 1 is a top view of an animal hydrating system according to an aspect of the invention.
Figure 2:
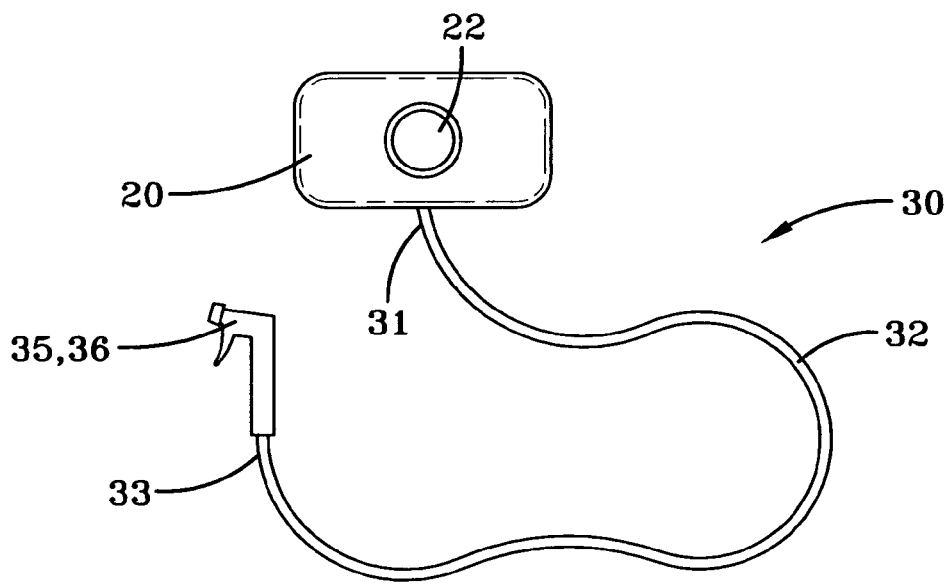
FIG. 2 is a view of a fluid container and fluid dispensing mechanism according to an aspect of the invention.
Figure 3:
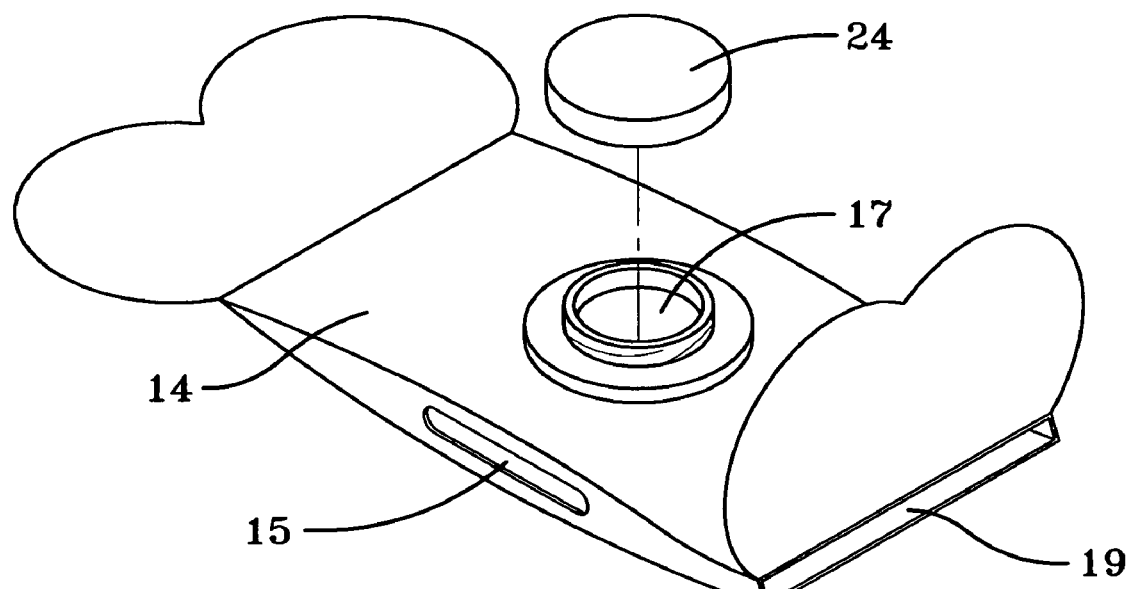
FIG. 3 is an isometric view of a fluid pocket according to an aspect of the invention.
Figure 4:
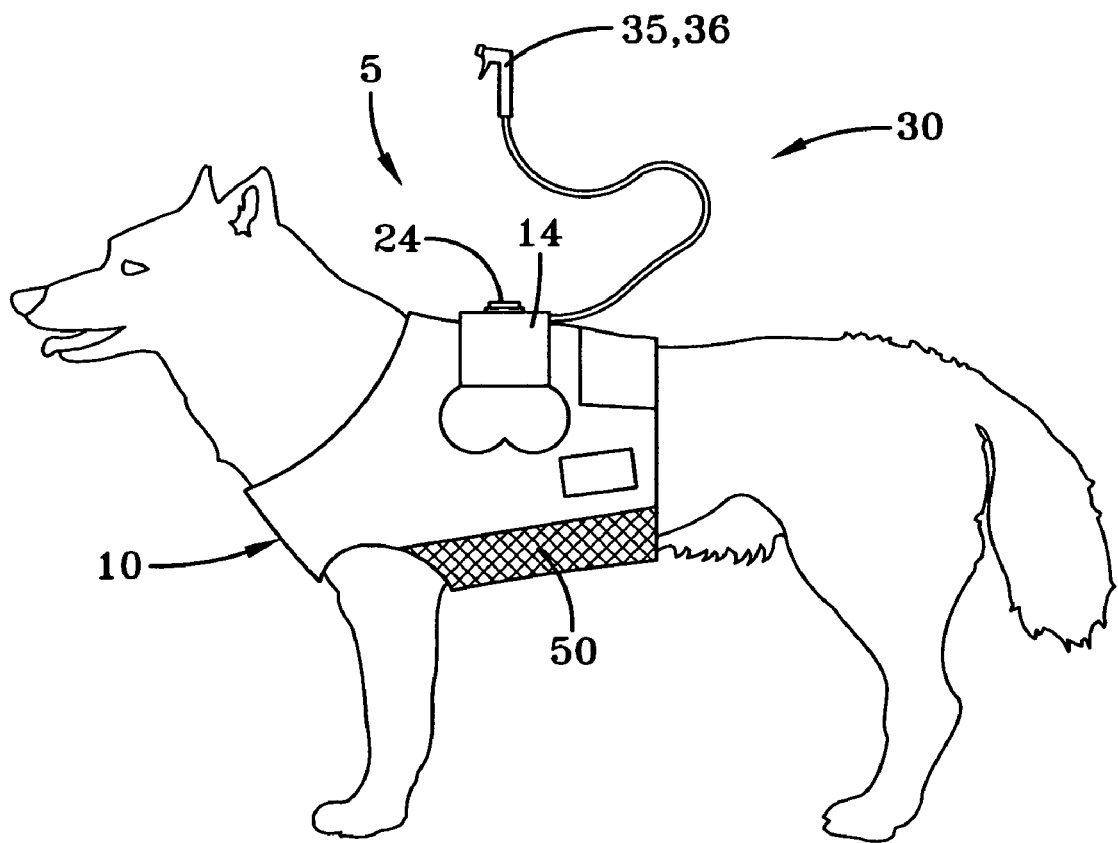
FIG. 4 is a view of an animal hydrating system on a dog, according to an aspect of the invention.
Figure 5:
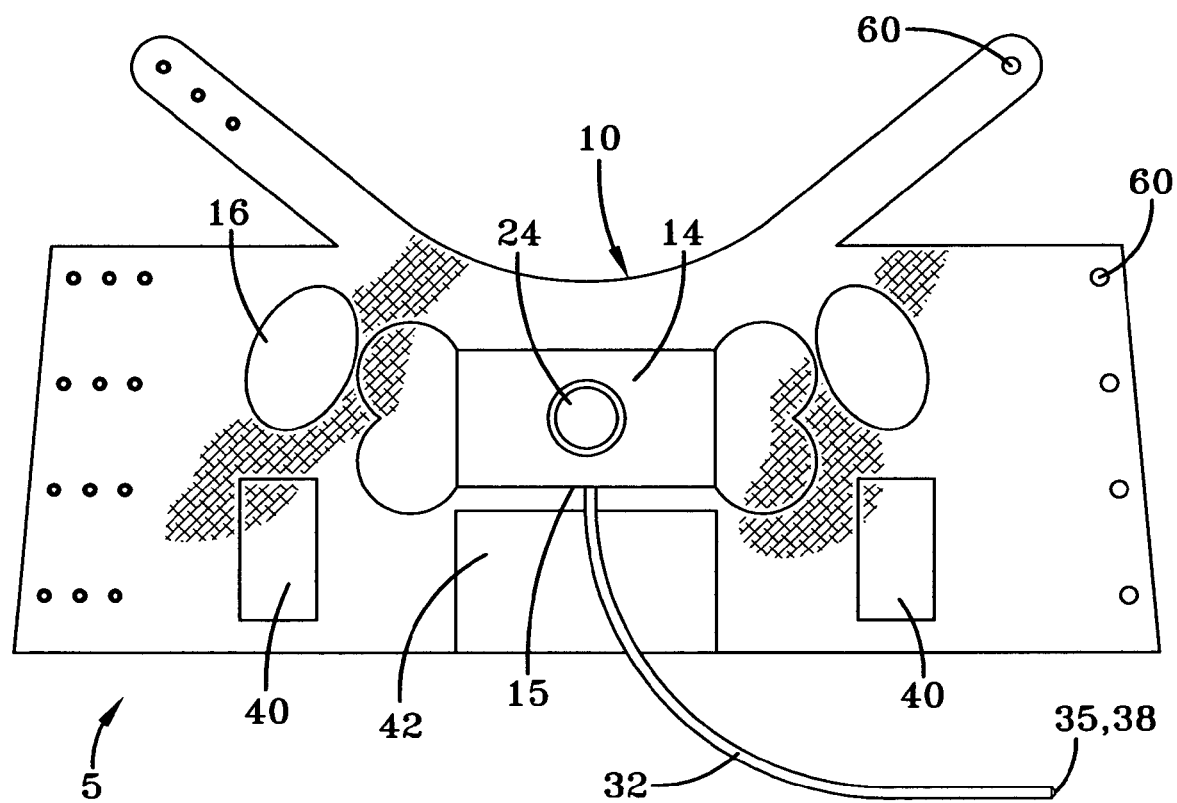
FIG. 5 is a top view of an animal hydrating system according to an aspect of the invention.

Various aspects of the invention are presented in FIGS. 1-4 which are not drawn to scale and in which like components are numbered alike. Referring now to these figures, according to an aspect of the invention, an animal self-carried hydrating system 5 comprises an animal harness 10, a fluid container 20 for holding the fluid, and a fluid dispensing mechanism 30. The animal harness 10 is securable on the animal by a fastening system 12. The animal harness 10 has a fluid pocket 14 for holding the fluid container 20. The fluid dispensing mechanism 30 is attached to the fluid container 20, in fluid communication with the fluid in the fluid container 20. The fluid dispensing mechanism 30 is such that it can dispense fluid from the fluid container 20 to the animal while the fluid container 20 is in the fluid pocket 14.

According to an aspect of the invention, the animal harness 10 secures on the animal around the animal's stomach, wherein there are holes 16 for the animals front legs. According to a further aspect of the invention, the animal harness 10 may be secured by a fastening system 12 comprising a hook and loop system. One such example of a hook and loop system, is VELCRO®. According to another aspect of the invention, the animal harness 10 may be secured by a fastening system 12 comprising snaps 60. These are just some examples of fastening systems that may be used, and any suitable fastening system is within the purview of this invention.

In a preferred embodiment of the invention, the fastening system 12 is adjustable, so as to fit various size animals.

To make it easier for the animal to carry the fluid, and so the weight is distributed more evenly, according to an aspect of the invention, the fluid pocket 14 is located so as to sit on the animal's back.

In a preferred embodiment of the invention, the fluid container 20 is a flexible bladder.

According to an aspect of the invention the fluid dispensing mechanism 30 comprises a flexible tube 32 and a dispensing mechanism 35 for dispensing the fluid to the animal. The flexible tube 32 has a first end 31, and an opposing second end 33. The first end 31 attached to the fluid container 20 so as to be in fluid communication with the fluid in the fluid container 20. Further, the flexible tubing 32 is of sufficient length to reach the mouth of the animal while the fluid container 30 remains in the fluid pocket 14. The dispensing mechanism 35 is located on the flexible tubing second end 33.

According to an aspect of the invention, the dispensing mechanism 35 is a ball valve 38, such that the animal may lick at the ball valve 38 and receive fluid therefrom.

In a preferred embodiment of the invention, the dispensing mechanism 35 comprises a spray mechanism 36 located on the flexible tubing second end 33. Thus, when the animal needs hydrated, the flexible tube 32 may be extended and the animal may be sprayed in the mouth for internal hydration, or on the coat or paws of the animal to cool down the animal.

These are just two types of dispensing mechanisms 35, and is not intended to limit the invention to these types of dispensing mechanisms, as any appropriate mechanism which dispenses fluids is considered within the purview of this invention.

According to a further aspect of the invention, the fluid pocket 14 further comprises a first access opening 15 wherein the fluid dispensing mechanism 30 can exit the fluid pocket 14 through the first access opening 15 to allow access to the animal. In a preferred embodiment of the invention, the fluid pocket 14 further comprises a second access opening 17, wherein the fluid container 20 can be accessed for filling through the second access opening 17. The fluid pocket 14 also has an insertion opening 19 for inserting the fluid container 20 into the fluid pocket 14. The insertion opening 19 may also be the first access opening 15, and may be sealable by a sealing mechanism, such as a hook and loop system, snaps, or any other suitable means.

According to another aspect of the invention, the fluid container 20 has a fill opening 22 for filling the fluid container 20, wherein the fill opening 22 protrudes from the fluid container 20 so as to fit through the fluid pocket second access opening 17. Further, the fill opening 17 is threaded and sealed by an opposite threaded cap 24, such that when the fluid container 20 is in the fluid pocket 14, the fluid container 20 is further secured in the fluid pocket 14 by the threaded cap 24. In a preferred embodiment, the fluid container 20 is comprised of a flexible material, such as a fluid bladder, to be more comfortable on the animal.

In a preferred embodiment, the animal harness 10 is comprised of a nylon material. In order to keep the animal cooler, in another preferred embodiment, a portion of the animal harness 10 is comprised of a nylon mesh 50 material.

According to a further aspect of the invention, the animal harness 10 further comprises additional pockets 40 for carrying additional fluid containers, or other articles. Cooler packs may be put into these pockets for additional animal cooling.

In a preferred embodiment of the invention, there is a pocket 42 for storing the dispensing mechanism 30 when not in use.

We claim:

1. An animal self-carried hydrating system for hydrating a four-legged animal, comprising:

an animal harness, securable on the animal by a fastening system;

a fluid container for holding a fluid;

a fluid pocket on said animal harness for holding said fluid container; and, a fluid dispensing mechanism attached to said fluid container, in fluid communication with the fluid in said fluid container, which is operated to dispense fluid from said fluid container directly to the four-legged animal while said fluid container is in said fluid pocket, wherein said fluid dispensing mechanism prevents the dispensing of fluid when not operated, wherein said fluid dispensing mechanism comprises a flexible tube having a first end and a second end, wherein said first end is attached to said fluid container so as to be in fluid communication with the fluid in said fluid container, and wherein said flexible tubing is of sufficient length to reach the mouth of the four-legged animal while said fluid container remains in said fluid pocket; and a dispensing mechanism on said flexible tubing second end, which is operated to dispense the fluid directly to the four-legged animal, wherein said dispensing mechanism prevents the dispensing of fluid when not operated, wherein said dispensing mechanism comprises a ball valve located on said flexible tubing second end, such that the four-legged animal may lick at the ball valve and receive fluid.

* * * * *